United States Patent
Yamanaka

(10) Patent No.: US 11,297,296 B2
(45) Date of Patent: Apr. 5, 2022

(54) DISPLAY CONTROL APPARATUS, PROGRAM, AND DISPLAY CONTROL METHOD

(71) Applicant: SONY CORPORATION, Tokyo (JP)

(72) Inventor: Daiki Yamanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/050,283

(22) PCT Filed: Mar. 27, 2019

(86) PCT No.: PCT/JP2019/013244
§ 371 (c)(1),
(2) Date: Oct. 23, 2020

(87) PCT Pub. No.: WO2019/230169
PCT Pub. Date: Dec. 5, 2019

(65) Prior Publication Data
US 2021/0084279 A1    Mar. 18, 2021

(30) Foreign Application Priority Data
May 30, 2018    (JP) .............................. JP2018-103088

(51) Int. Cl.
| | |
|---|---|
| *H04N 13/122* | (2018.01) |
| *G06T 7/73* | (2017.01) |
| *G06T 19/00* | (2011.01) |
| *G06T 19/20* | (2011.01) |

(52) U.S. Cl.
CPC ............. *H04N 13/122* (2018.05); *G06T 7/73* (2017.01); *G06T 19/006* (2013.01); *G06T 19/20* (2013.01); *G06T 2207/10028* (2013.01)

(58) Field of Classification Search
CPC ....... H04N 13/122; G06T 7/73; G06T 19/006; G06T 19/20; G06T 2207/10028
See application file for complete search history.

(56) References Cited

U.S. PATENT DOCUMENTS

2019/0188852 A1* 6/2019 Reicher .................... G06N 5/02

FOREIGN PATENT DOCUMENTS

| JP | 2012-221250 A | 11/2012 |
|---|---|---|
| WO | WO 2017/056567 A1 | 4/2017 |

* cited by examiner

*Primary Examiner* — Chong Wu
(74) *Attorney, Agent, or Firm* — Paratus Law Group, PLLC

(57) ABSTRACT

Unnatural display is reduced by changing the appearance of a real space. A display control apparatus includes: an information acquisition unit that acquires reliability information indicating reliability of each of element data constituting three-dimensional data of a real space; a region specification unit that specifies a region corresponding to element data of which the reliability does not meet a criterion; and a display control unit that performs display control for changing the appearance of the region specified by the region specification unit.

12 Claims, 12 Drawing Sheets

FIG. 5
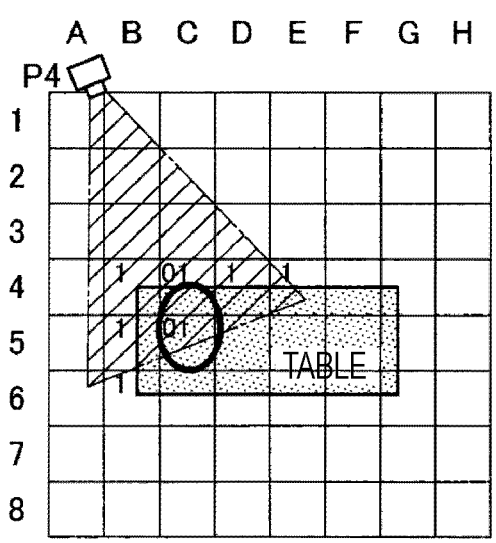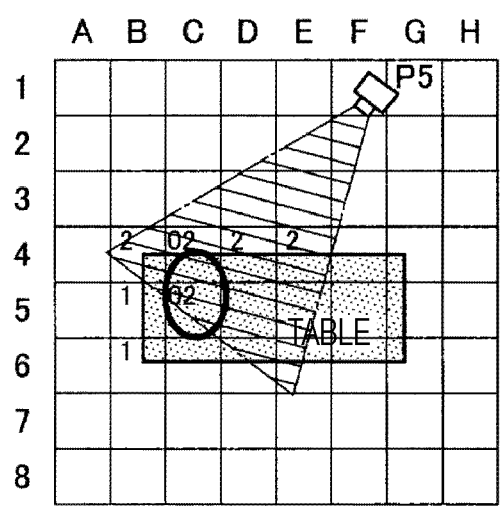

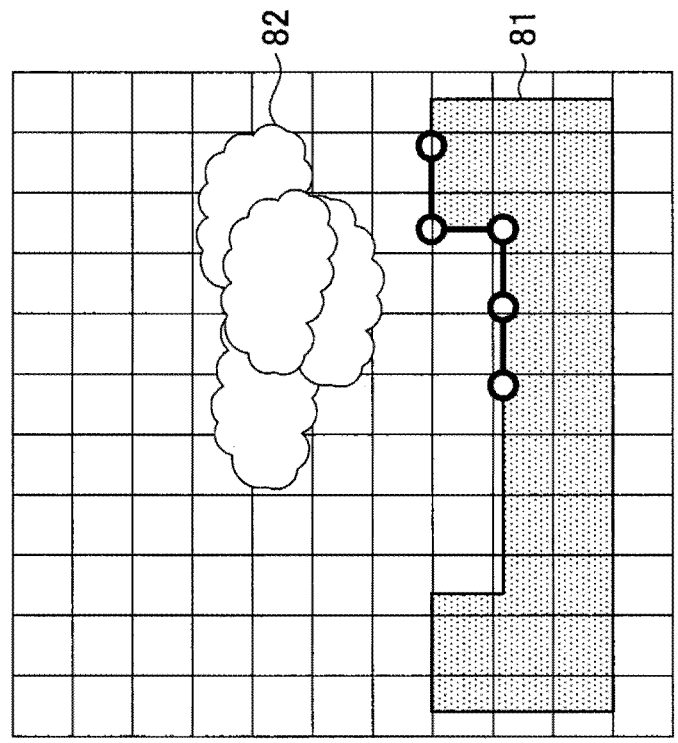
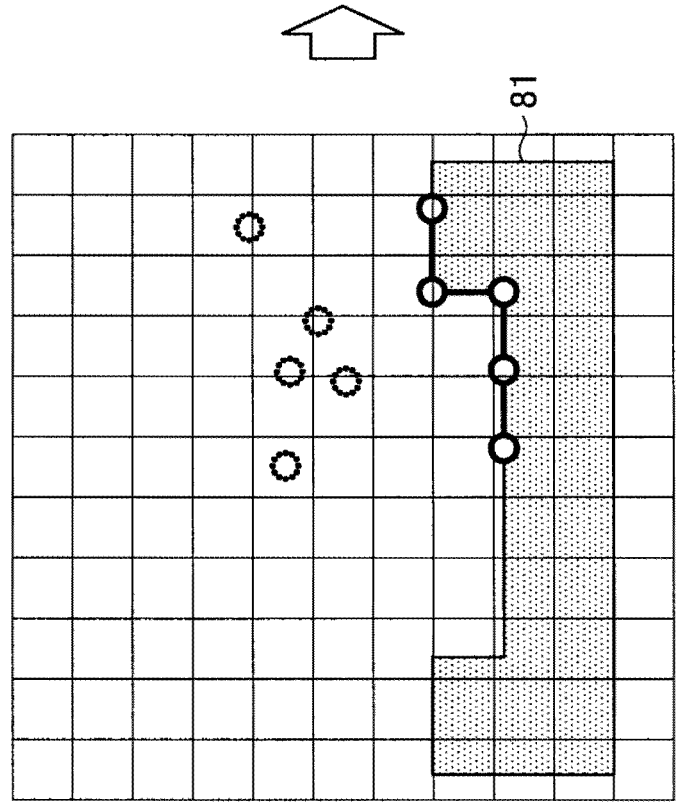
FIG. 14

DISPLAY CONTROL APPARATUS, PROGRAM, AND DISPLAY CONTROL METHOD

CROSS REFERENCE TO PRIOR APPLICATION

This application is a National Stage Patent Application of PCT International Patent Application No. PCT/JP2019/013244 (filed on Mar. 27, 2019) under 35 U.S.C. § 371, which claims priority to Japanese Patent Application No. 2018-103088 (filed on May 30, 2018), which are all hereby incorporated by reference in their entirety.

TECHNICAL FIELD

The present disclosure relates to a display control apparatus, a program, and a display control method.

BACKGROUND ART

In recent years, technology called augmented reality (AR) which superimposes a virtual object display on a real space has been receiving attention. For example, an information processing terminal which performs an AR process recognizes three-dimensional data of a real space, a three-dimensional position set for a virtual object, and a three-dimensional position of the information processing terminal, specifies a position corresponding to the three-dimensional position set for the virtual object in a real-space image obtained by imaging by the information processing terminal, and superimposes a virtual object display on the specified position. Therefore, a user can feel as if the virtual object exists in the real space. Such an AR process is disclosed in Patent Document 1, for example.

CITATION LIST

Patent Document

Patent Document 1: Japanese Patent Application Laid-Open No. 2012-221250

SUMMARY OF THE INVENTION

Problems to be Solved by the Invention

In an AR process, an information processing terminal desirably does not superimpose a virtual object display on a real-space image in a case where a three-dimensional position of a virtual object is set behind an object in a real space. However, in a case where there is a difference between a three-dimensional structure of the real space indicated by three-dimensional data of the real space and an actual three-dimensional structure of the real space, the virtual object display may be erroneously superimposed, or a virtual object display to be superimposed may not be superimposed, so that an unnatural AR image may be obtained.

In this regard, Patent Document 1 discloses a method of changing an aspect of a virtual object display depending on the stability of recognition of a position or a posture of a real object on which the virtual object display is superimposed.

The present disclosure proposes a display control apparatus, a program, and a display control method which are novel and improved, and capable of reducing unnatural display by changing the appearance of a real space.

Solutions to Problems

According to the present disclosure, a display control apparatus is provided, the apparatus including: an information acquisition unit that acquires reliability information indicating reliability of each of element data constituting three-dimensional data of a real space; a region specification unit that specifies a region corresponding to element data of which the reliability does not meet a criterion; and a display control unit that performs display control for changing the appearance of the region specified by the region specification unit.

Furthermore, according to the present disclosure, a program is provided, the program being configured to cause a computer to function as: an information acquisition unit that acquires reliability information indicating reliability of each of element data constituting three-dimensional data of a real space; a region specification unit that specifies a region corresponding to element data of which the reliability does not meet a criterion; and a display control unit that performs display control for changing the appearance of the region specified by the region specification unit.

Furthermore, according to the present disclosure, a display control method is provided, the method including: acquiring reliability information indicating reliability of each of element data constituting three-dimensional data of a real space; specifying a region corresponding to element data of which the reliability does not meet a criterion; and performing, by a processor, display control for changing the appearance of the region that has been specified.

Effects of the Invention

As described above, according to the present disclosure, it is possible to reduce unnatural display by changing the appearance of the real space. Note that the effects described above are not necessarily limited, and any of the effects illustrated in the present description, or other effects that can be known from the present description may be achieved together with or in place of the effects described above.

BRIEF DESCRIPTION OF DRAWINGS

FIG. 5 is an explanatory diagram illustrating a second method of calculating reliability.

FIG. 14 is an explanatory diagram illustrating a method of arranging an additional object.

MODE FOR CARRYING OUT THE INVENTION

Figure 1:
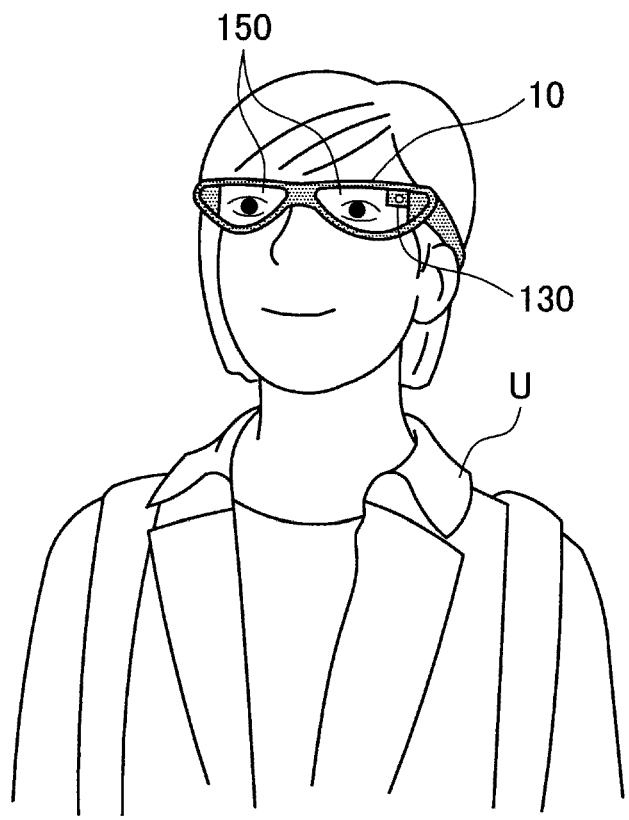
FIG. 1 is an explanatory view illustrating the appearance of an information processing terminal 10 according to an embodiment of the present disclosure.

Hereinafter, a preferred embodiment of the present disclosure will be described in detail with reference to the accompanying drawings. Note that in the present description and drawings, the same reference numeral is added to components having substantially the same functional configuration, and repeated descriptions thereof will be omitted.

Furthermore, in the present description and drawings, multiple components having substantially the same functional configuration are sometimes distinguished from each other by adding different alphabets after the same reference numeral. However, in a case where there is no need to particularly distinguish each of the multiple components having substantially the same functional configuration, only the same reference numeral is added to each of the multiple components.

Furthermore, the present disclosure will be described according to the following item order.
1. Overview of Information Processing Terminal
2. Configuration of Information Processing Terminal
3. Operation of Information Processing Terminal
4. Display Control Examples
4-1. First Display Control Example
4-2. Second Display Control Example
4-3. Third Display Control Example
4-4. Fourth Display Control Example
5. Hardware Configuration
6. Conclusion

1. Overview of Information Processing Terminal

FIG. 1 is an explanatory view illustrating the appearance of an information processing terminal 10 according to an embodiment of the present disclosure. As illustrated in FIG. 1, the information processing terminal 10 according to the present embodiment is realized by, for example, a glasses-type head-mounted display (HMD) mounted on the head of user U.

The information processing terminal 10 is an example of a display control apparatus, and includes an imaging unit 130 and display units 150 as illustrated in FIG. 1. The imaging unit 130 is oriented in a line-of-sight direction of user U and acquires an image of a subject existing in the line-of-sight direction of user U. The display units 150 are positioned in front of the eyes of user U when the information processing terminal 10 is worn by the user. The display units 150 may be each a transmissive display or a non-transmissive display. In a case where the display units 150 are each a transmissive display, a virtual object display may be arranged on each of the display units 150. On the other hand, in a case where the display units 150 are each a non-transmissive display, a real-space image obtained by the imaging unit 130 and a virtual object display superimposed on the real-space image may be displayed on each of the display units 150. In any case, user U can obtain a feeling as if a virtual object exists in the real space.

Note that, although FIG. 1 illustrates an example in which two display units 150 are provided in front of both eyes of user U, one display unit 150 may be provided only in front of one eye of user U. Furthermore, although the glasses-type information processing terminal 10 is illustrated as an example of the display control apparatus in FIG. 1, the display control apparatus is not limited to the glasses-type information processing terminal 10. For example, the display control apparatus may be an HMD of headband type (a type of HMD that is worn using a band that goes around the entire circumference of the head, and furthermore, there is a case where a band that passes through not only the sides of the head but also the top of the head is provided), or an HMD of helmet type (a visor portion of a helmet corresponds to a display). Furthermore, the display control apparatus may be realized by a wearable device such as that of a wristband type (for example, a smart watch with or without a display), a headphone type (without a display), or a neckphone type (neck hanging type with or without a display). Furthermore, the display control apparatus may be a mobile terminal such as a smartphone or a mobile phone.

Here, reference will be made to a method of superimposing a virtual object display on a real-space image in a case where the display unit 150 is a non-transmissive display. The information processing terminal 10 recognizes three-dimensional data of the real space, a three-dimensional position set for a virtual object, and a three-dimensional position of the information processing terminal 10, specifies a position corresponding to the three-dimensional position set for the virtual object in a real-space image obtained by the information processing terminal 10, and superimposes a virtual object display on the specified position.

Regarding an AR process, that is, the superimposition of the virtual object display, the information processing terminal 10 desirably does not superimpose the virtual object display on the real-space image in a case where the three-dimensional position of the virtual object is set behind an object in the real space. However, in a case where the accuracy of the three-dimensional data of the real space is low, there is a concern that the virtual object display is erroneously superimposed, or the virtual object display to be superimposed is not superimposed, so that an unnatural AR image is obtained. This point will be described more specifically with reference to FIG. 2.

Figure 2:
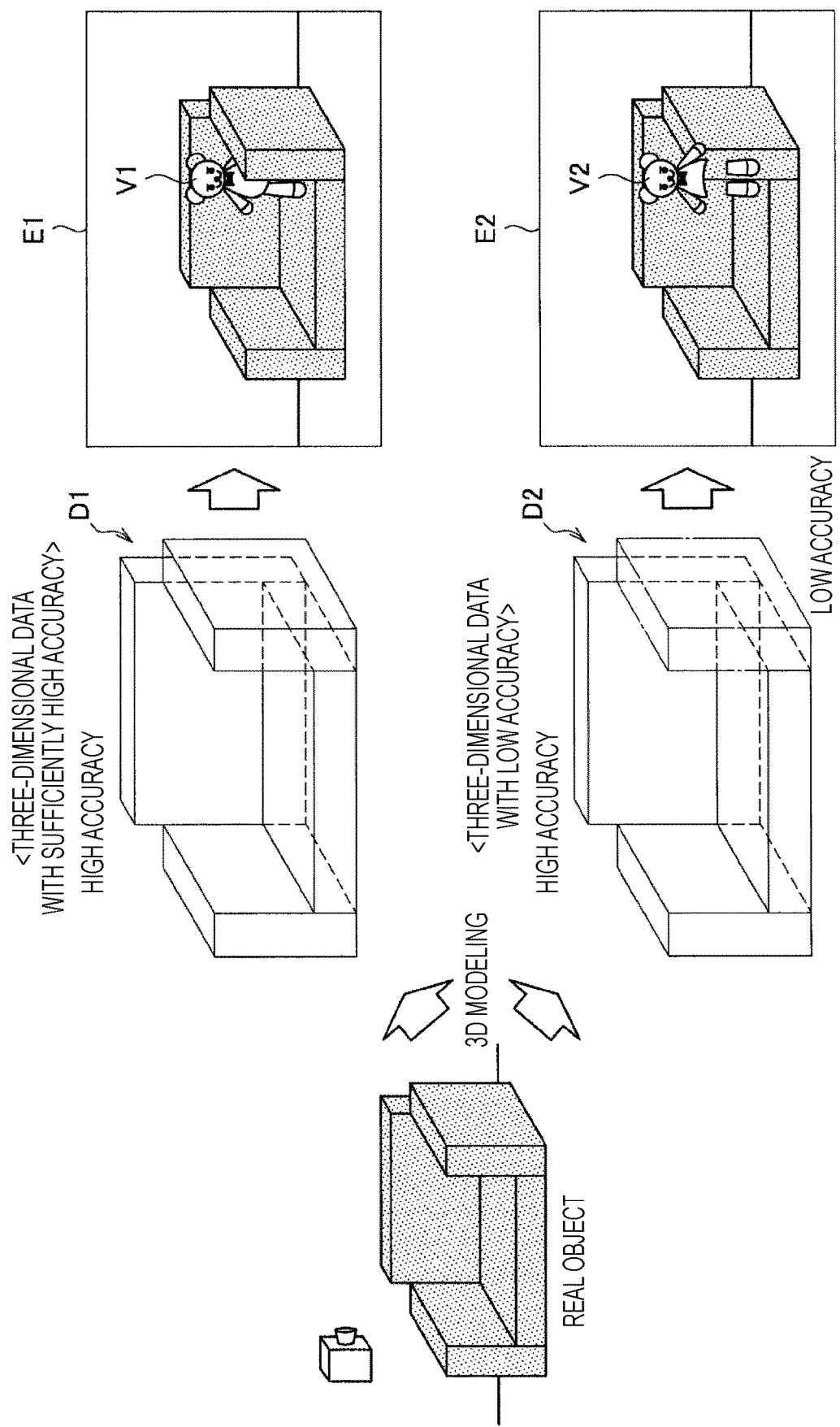
FIG. 2 is an explanatory diagram illustrating a specific example of an AR process.

FIG. 2 is an explanatory diagram illustrating a specific example of the AR process. In a case where highly accurate three-dimensional data D1 is obtained for the entirety of a sofa which is a real object illustrated in FIG. 2, and a three-dimensional position of a virtual object is set on a seat surface of the sofa, an image E1 is displayed in which a virtual object display V1 has been superimposed on an image of the sofa. In the image E1, the virtual object display V1 is not superimposed on a region of an armrest of the sofa, so that the user can feel that the virtual object exists behind the armrest of the sofa.

On the other hand, in a case where the recognition accuracy of the region of the armrest of the sofa is low as illustrated by broken lines in three-dimensional data D2, there is a concern that an error occurs in determination of an in-front/behind relationship between the virtual object and the armrest region, and as a result, a virtual object display V2 including an unnaturally missing portion is superimposed on the image of the sofa as illustrated in an image E2.

The present inventor has created the embodiment of the present disclosure with the above-described circumstances as one point of view. According to the embodiment of the present disclosure, it is possible to reduce unnatural display by changing the appearance of the real space in the AR process. Hereinafter, a configuration and an operation of the information processing terminal 10 according to such an embodiment of the present disclosure will be sequentially described in detail. Note that in the following, the embodiment will be described mainly assuming that the display unit 150 is a non-transmissive display, but the embodiment of the present disclosure can be similarly applied to a transmissive display.

2. Configuration of Information Processing Terminal

Figure 3:
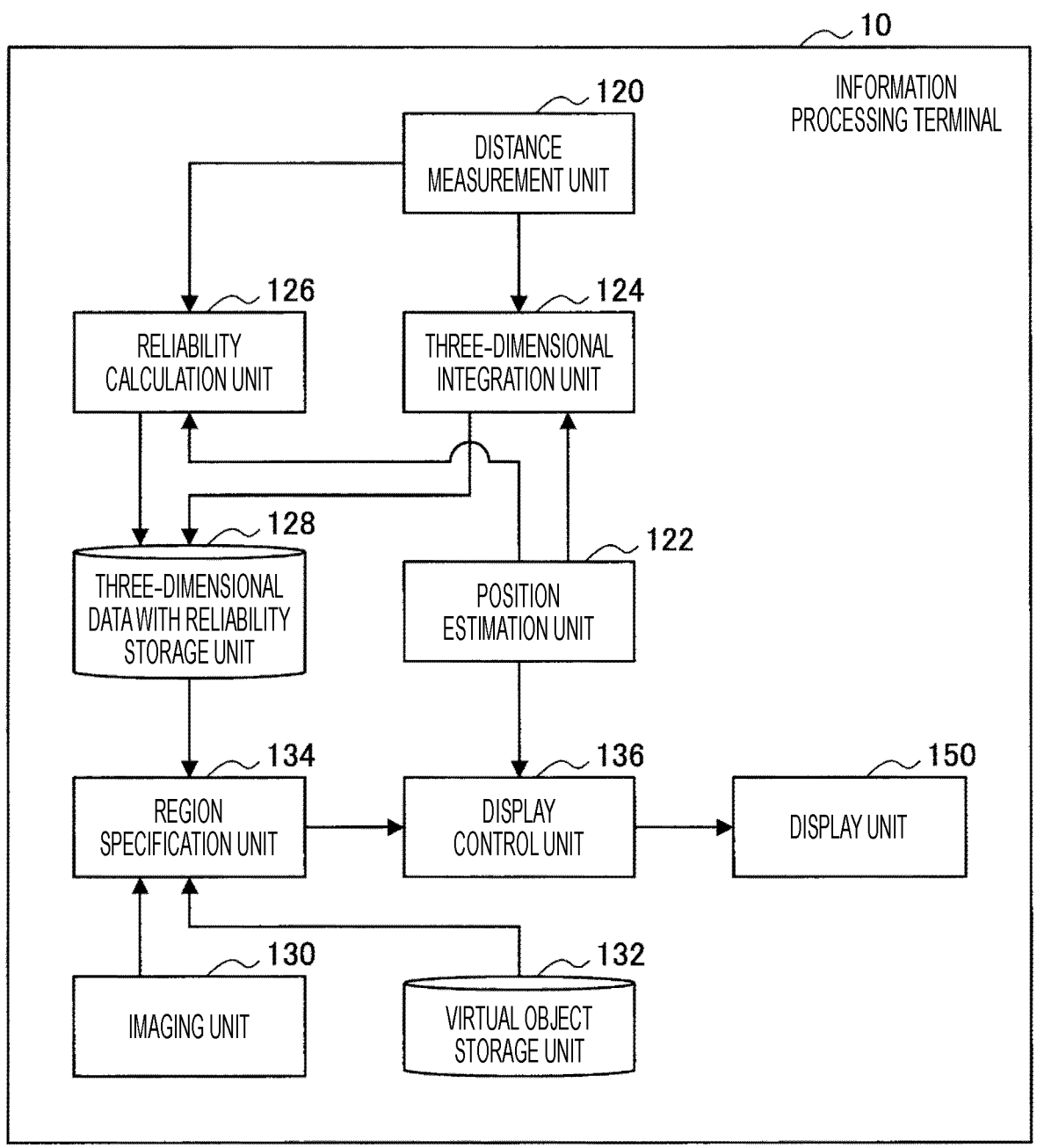
FIG. 3 is an explanatory diagram illustrating a configuration of the information processing terminal 10.

FIG. 3 is an explanatory diagram illustrating the configuration of the information processing terminal 10. As illustrated in FIG. 3, the information processing terminal 10 according to the embodiment of the present disclosure includes a distance measurement unit 120, a position estimation unit 122, a three-dimensional integration unit 124, a reliability calculation unit 126, a three-dimensional data with reliability storage unit 128, the imaging unit 130, a virtual object storage unit 132, a region specification unit 134, a display control unit 136, and the display unit 150.

(Distance Measurement Unit)

The distance measurement unit 120 measures a distance from a viewpoint position to an object in the real space on the basis of images obtained by multiple cameras and a positional relationship between the multiple cameras to acquire a depth map. The distance measurement unit 120 may be multi-view stereo or IR pattern projection stereo.

(Position Estimation Unit)

The position estimation unit 122 estimates a position of the information processing terminal 10. The position estimation unit 122 estimates a change in a viewpoint position, for example, by comparing multiple images obtained at different timings. In a case where a stereo camera, a monocular camera, or the like is used for imaging, the position estimation unit 122 may estimate an imaging position using Visual simultaneous localization and mapping (SLAM).

(Three-Dimensional Integration Unit)

The three-dimensional integration unit 124 generates three-dimensional data of the real space by integrating depth maps obtained at a plurality of viewpoint positions. For example, the three-dimensional integration unit 124 can use, as three-dimensional data, a truncated signed distance function (TSDF) on a voxel volume, a point cloud, or the like. It is possible to obtain three-dimensional data of a large-scale space by integrating the depth maps obtained at the plurality of viewpoint positions. Note that it is also possible to use three-dimensional data prepared in advance, and in such a case, alignment of a line-of-sight position and a mesh model is performed.

Furthermore, The three-dimensional integration unit 124 extracts a polygon mesh from the three-dimensional data. In a case where the TSDF is used as the three-dimensional data, the three-dimensional integration unit 124 may use marching cubes to extract a surface of $f(x)=0$ (f represents a distance field, and x represents a three-dimensional position). In a case where the point cloud is used as the three-dimensional data, the three-dimensional integration unit 124 may use Poisson surface reconstruction.

(Reliability Calculation Unit)

The reliability calculation unit 126 calculates the reliability of each of element data constituting the three-dimensional data. For example, the reliability calculation unit 126 calculates the reliability of each voxel constituting the three-dimensional data. Hereinafter, a specific example of the calculation of the reliability will be described with reference to FIGS. 4 and 5.

Figure 4:
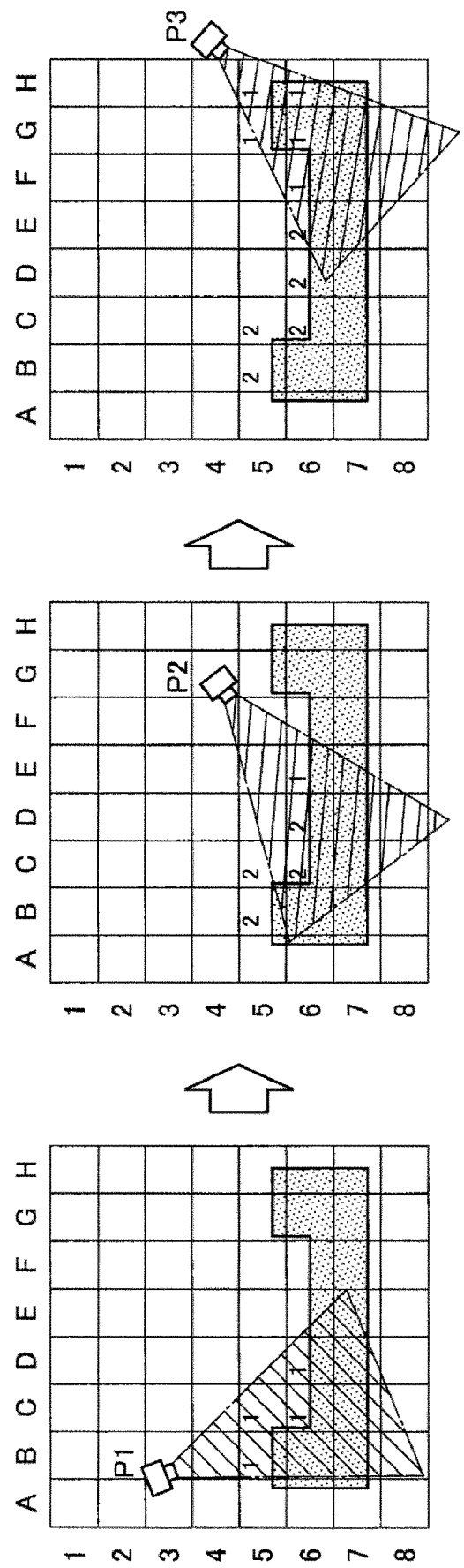
FIG. 4 is an explanatory diagram illustrating a first method of calculating reliability.

FIG. 4 is an explanatory diagram illustrating a first method of calculating the reliability. FIG. 4 illustrates plan views of a room, and each voxel is schematically illustrated in each of the plan views. Although there are multiple voxels in a height direction as well, only one voxel is illustrated in the height direction for convenience of explanation.

The first method is a method of calculating the sum of the numbers of times each voxel is observed as the reliability of corresponding voxel. Consideration is given to a case where depth maps are obtained at viewpoint positions P1, P2, and P3 as illustrated in FIG. 4. In such a case, voxels B5, C5, C6 and D6 are observed at the viewpoint position P1, voxels B5, C5, C6, D6, and E6 are observed at the viewpoint position P2, and voxels E6, F6, G5, G6, H5, and H6 are observed at the viewpoint position P3. As a result. FIG. 4 illustrates an example in which B5=2, C5=2, C6=2, D6=2, E6=2, F6=1, G5=1, G6=1, H5=1, and H6=1 are obtained by calculation as the reliabilities of respective voxels.

FIG. 5 is an explanatory diagram illustrating a second method of calculating the reliability. FIG. 5 illustrates plan views of a room similarly to FIG. 4, and each voxel is schematically illustrated in each of the plan views. Although there are multiple voxels in a height direction as well, only one voxel is illustrated in the height direction for convenience of explanation.

The second method is a method of calculating a value of the sum of individual reliabilities set for a voxel observed in respective depth maps as the reliability of corresponding voxel. Consideration is given to a case where depth maps are obtained at viewpoint positions P4 and P5 as illustrated in FIG. 5. In such a case, multiple voxels are observed at each of the viewpoint position P4 and the viewpoint position P5, but the individual reliabilities of distances measured for respective voxels are different from each other. The individual reliability may be, for example, reflectance in ToF or a score of stereo matching. As a result. FIG. 5 illustrates an example in which B4=2, B5=1, B6=1, C4=0.2, C5=0.2, D4=2, and E4=2 are obtained by calculation as the reliabilities of respective voxels.

Note that the reliability calculation unit 126 may calculate the reliability of each polygon mesh (one triangle in a case of a triangular mesh) as the reliability of each of the element data constituting the three-dimensional data. In such a case, the polygon mesh may be assigned the reliability of a voxel or a point corresponding to the polygon mesh. In a case where a polygon mesh corresponds to multiple voxels or multiple points, the reliability calculation unit 126 may assign the polygon mesh an average value of the reliabilities of the multiple voxels or an average value of the reliabilities of the multiple points.

(Three-Dimensional Data with Reliability Storage Unit)

The three-dimensional data with reliability storage unit 128 stores data in which each of the element data constituting the three-dimensional data generated by the three-dimensional integration unit 124 is associated with reliability information indicating the reliability calculated by the reliability calculation unit 126, that is, three-dimensional data with reliability. Note that the element data associated with the reliability information may be a voxel or a polygon mesh. In the following, a description will be given mainly on the assumption that the reliability information is associated with the polygon mesh.

(Imaging Unit)

As described with reference to FIG. 1, the imaging unit 130 is oriented in the line-of-sight direction of the user and acquires an image of a subject existing in the line-of-sight direction of the user.

(Virtual Object Storage Unit)

The virtual object storage unit 132 stores a virtual object display which relates to each virtual object and is display data of the virtual object, and virtual display data including a three-dimensional position set for the virtual object. Note that the virtual object may move, and in such a case, a dynamically changing three-dimensional position is set for the virtual object.

(Region Specification Unit)

The region specification unit 134 specifies a region corresponding to element data of which the reliability does not meet a criterion in the three-dimensional data. The region specification unit 134 has, for example, a function of an information acquisition unit which acquires three-dimensional data with reliability from the three-dimensional data with reliability storage unit 128, and can obtain a reliability map by projecting the three-dimensional data (mesh model) onto the position of the information processing terminal 10, and giving, to each pixel, the reliability of the element data corresponding to each pixel. Then, on the basis of pixels of which the reliability is below a reference value in the reliability map, the region specification unit 134 may specify a three-dimensional region corresponding to the element data of which the reliability is below the reference value, or a two-dimensional region specified on the real-space image obtained by the imaging unit 130.

(Display Control Unit and Display Unit)

The display control unit 136 uses the virtual display data stored in the virtual object storage unit 132 to superimpose the virtual object display on the real-space image obtained by the imaging unit 130, and displays the real-space image on which the virtual object display is superimposed on the display unit 150. Moreover, the display control unit 136 performs display control for changing the appearance of the region specified by the region specification unit 134. The display control will be described in detail from "4. Display Control Examples". According to the display control of the embodiment of the present disclosure, as compared with a terminal in which the display control of the embodiment of the present disclosure is not implemented, it is possible to reduce unnatural virtual object display which may occur in a case where there is a difference between a three-dimensional structure of a real space indicated by three-dimensional data and an actual three-dimensional structure of the real space.

3. Operation of Information Processing Terminal

The configuration of the information processing terminal 10 according to the embodiment of the present disclosure has been described above. Next, with reference to FIG. 6, an operation of the information processing terminal 10 according to the embodiment of the present disclosure will be summarized.

Figure 6:
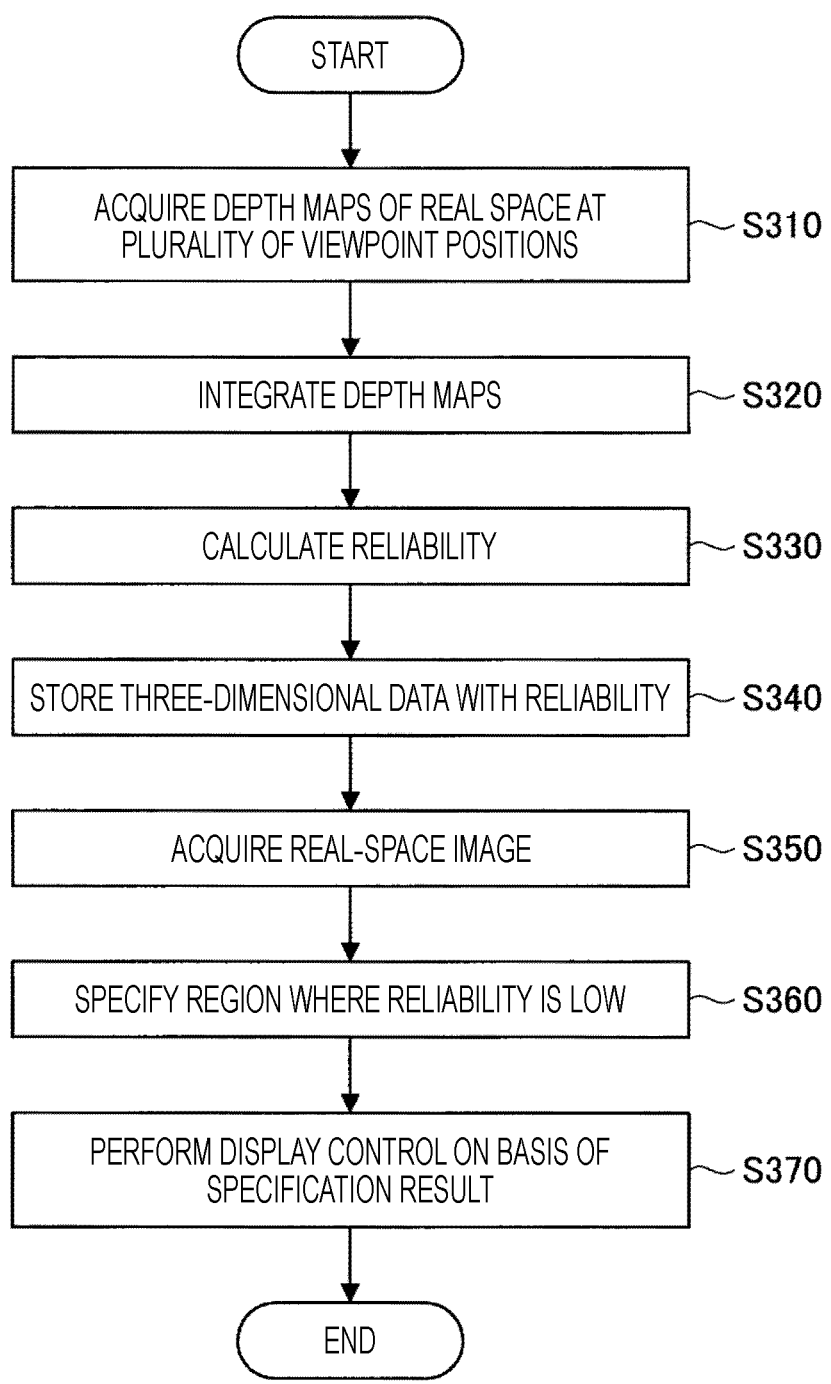
FIG. 6 is a flowchart illustrating an operation of the information processing terminal 10.

FIG. 6 is a flowchart illustrating the operation of the information processing terminal 10. As illustrated in FIG. 6, first, the distance measurement unit 120 acquires depth maps of a real space at a plurality of viewpoint positions (S310). Then, the three-dimensional integration unit 124 generates three-dimensional data representing a three-dimensional structure of the real space by integrating a plurality of depth maps acquired by the distance measurement unit 120 (S320). Furthermore, the reliability calculation unit 126 calculates the reliability of each of the element data constituting the three-dimensional data generated by the three-dimensional integration unit 124 (S330). Then, the three-dimensional data with reliability storage unit 128 stores three-dimensional data with reliability (S340).

Thereafter, when a real-space image is acquired by the imaging unit 130 (S350), the region specification unit 134 specifies, on the real-space image, a region corresponding to element data of which the reliability does not meet a criterion in the three-dimensional data, for example (S360). Then, the display control unit 136 performs display control for changing the appearance of the region specified by the region specification unit 134 (S370). Hereinafter, some specific examples of the display control by the display control unit 136 will be sequentially described in detail with reference to FIGS. 7 to 14.

4. Display Control Examples (4-1. First Display Control Example)

A first display control example is an example of display control performed in a case where a region corresponding to element data of which the reliability does not meet a criterion (low-reliability region) overlaps a position set for a virtual object in a real-space image. The display control unit 136 does not superimpose a virtual object display on the real-space image in a case where the low-reliability region overlaps the position set for the virtual object in the real-space image. Specifically, the display control unit 136 does not have to superimpose the virtual object display on the real-space image in a case where the low-reliability region exists on a viewpoint position side of the three-dimensional position set for the virtual object. Hereinafter, such a first display control example will be described more specifically with reference to FIG. 7.

Figure 7:
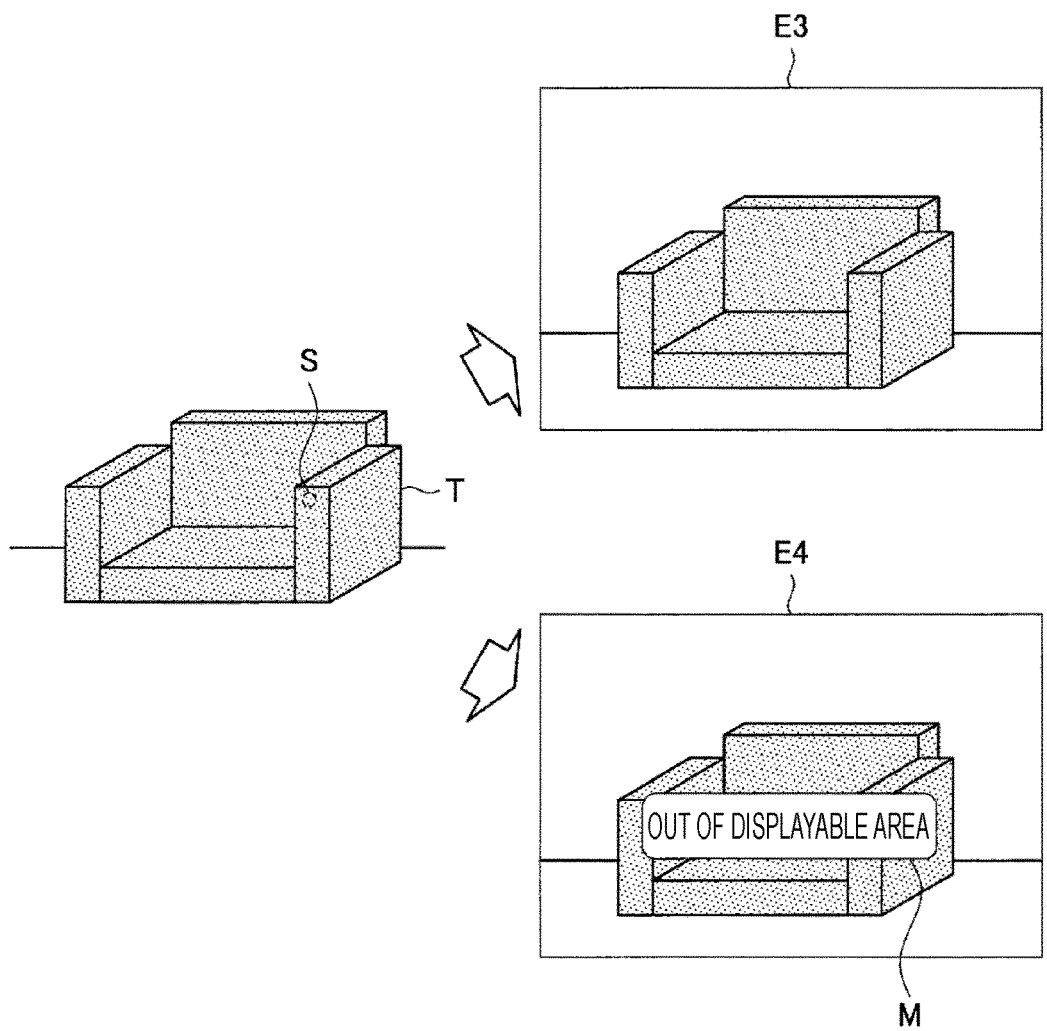
FIG. 7 illustrates and explains a specific example of a first display control example.

FIG. 7 illustrates and explains a specific example of the first display control example. Consideration is given to a case where an armrest region T in three-dimensional data of a real object (sofa) illustrated in FIG. 7 is a low-reliability region, and the armrest region T exists on a viewpoint position side of a position S set for a virtual object. In such a case, the display control unit 136 does not have to superimpose a virtual object display on a real-space image as illustrated in an image E3. Therefore, it is possible to suppress the occurrence of an unnatural virtual object display.

Furthermore, as illustrated in an image E4, the display control unit 136 may display a message M (in the example illustrated in FIG. 7, a message stating "OUT OF DISPLAYABLE AREA.") indicating that the virtual object display is not superimposed due to a relationship between the position set for the virtual object and the armrest region T. With such a configuration, the user can understand without confusion the reason why the virtual object display is not superimposed.

(4-2. Second Display Control Example)

In a second display control example, display control is performed on a low-reliability region in a real-space image for reducing the visibility of the low-reliability region. The display control unit 136 may set transparency to the low-reliability region in the real-space image, or may arrange another display in the low-reliability region in the real-space image, for example. Hereinafter, such a second display control example will be described more specifically with reference to FIGS. 6 to 10.

Figure 8:
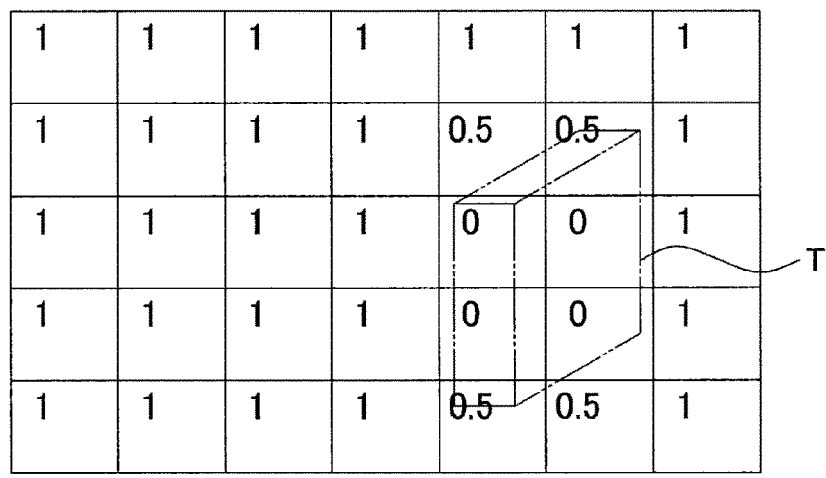
FIG. 8 is an explanatory diagram illustrating a specific example of a reliability map.

FIG. 8 is an explanatory diagram illustrating a specific example of a reliability map. Although FIG. 8 illustrates an example in which the number of pixels constituting the reliability map is 35 for convenience of explanation, the reliability map can be constituted by a larger number of pixels. In the example illustrated in FIG. 8, the reliability of pixels including the armrest region T of the sofa is 0 to 0.5. In a case where the region specification unit 134 specifies a region corresponding to a pixel having a reliability of less than "1" as the low-reliability region, the region specification unit 134 specifies the armrest region T as the low-reliability region.

Figure 9:
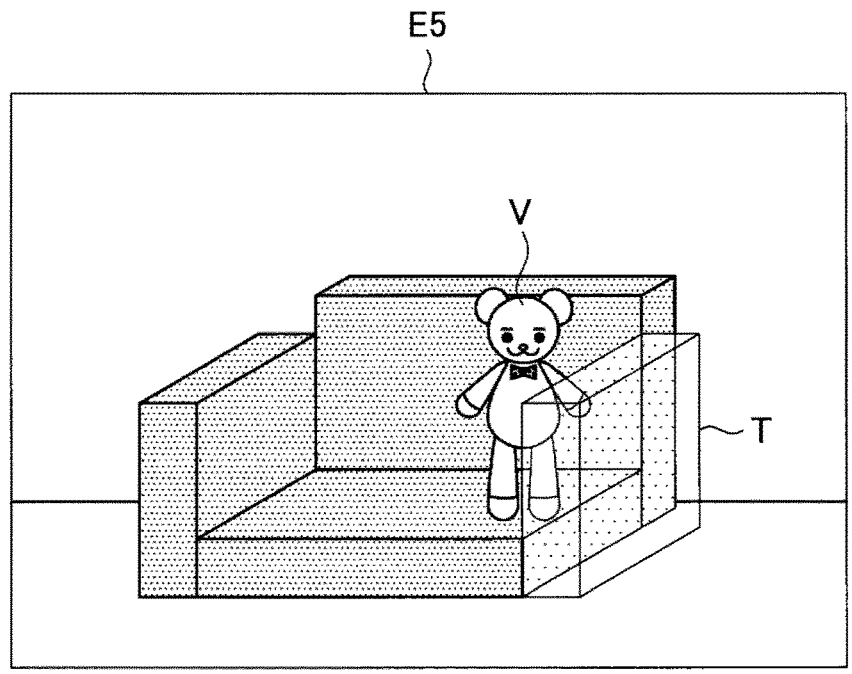
FIG. 9 is an explanatory diagram illustrating a second display control example.

FIG. 9 is an explanatory diagram illustrating the second display control example. As in an image E5 illustrated in FIG. 9, the display control unit 136 may set transparency to the armrest region T specified as the low-reliability region. With such a configuration, even if there is an error in an in-front/behind representation of a virtual object display V and the armrest region T, the error becomes inconspicuous, so that it is possible to reduce an unnatural impression given to the user. Here, the display control unit 136 may set transparency to respective portions constituting the armrest region T in such a way that the lower the reliability of pixels on a reliability map corresponding to respective portions, the higher the transparency to be set to the portions. With such a configuration, it is possible to smoothly transition the transparency between the low-reliability region and another region. Note that the display control for reducing the visibility of the low-reliability region is not limited to the setting of transparency, and may be, for example, blur amount control or color density control.

Figure 10:
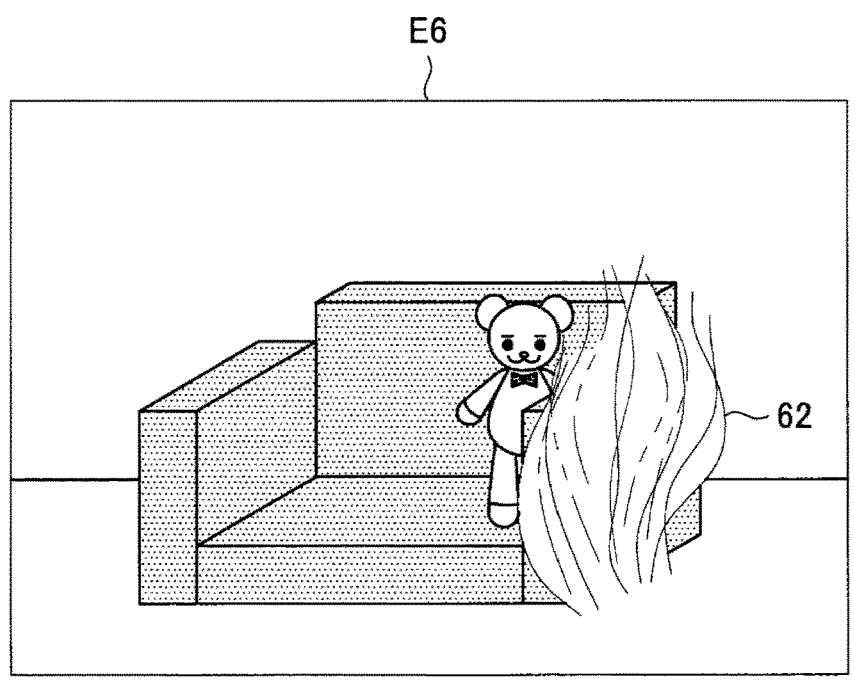
FIG. 10 is an explanatory diagram illustrating another second display control example.

FIG. 10 is an explanatory diagram illustrating another second display control example. As in an image E6 illustrated in FIG. 10, the display control unit 136 may arrange a texture display 62 at the armrest region T specified as the low-reliability region. With such a configuration, even if there is an error in an in-front/behind relationship between the virtual object display V and the armrest region T, the error becomes inconspicuous, so that it is possible to reduce an unnatural impression given to the user. Here, the display control unit 136 may arrange the texture display 62 in respective portions constituting the armrest region T in such a way that the lower the reliability of pixels on the reliability map corresponding to respective portions, the higher the density of the texture display 62 to be arranged in the portions. With such a configuration, it is possible to smoothly transition the presence of the texture display 62 between the low-reliability region and another region.

(4-3. Third Display Control Example)

In a third display control example, a substitute object of a real object is arranged at a position corresponding to the low-reliability region in the three-dimensional data, and particularly at the same position as the low-reliability region in the three-dimensional data. Hereinafter, such a third display control example will be described more specifically with reference to FIG. 11

Figure 11:
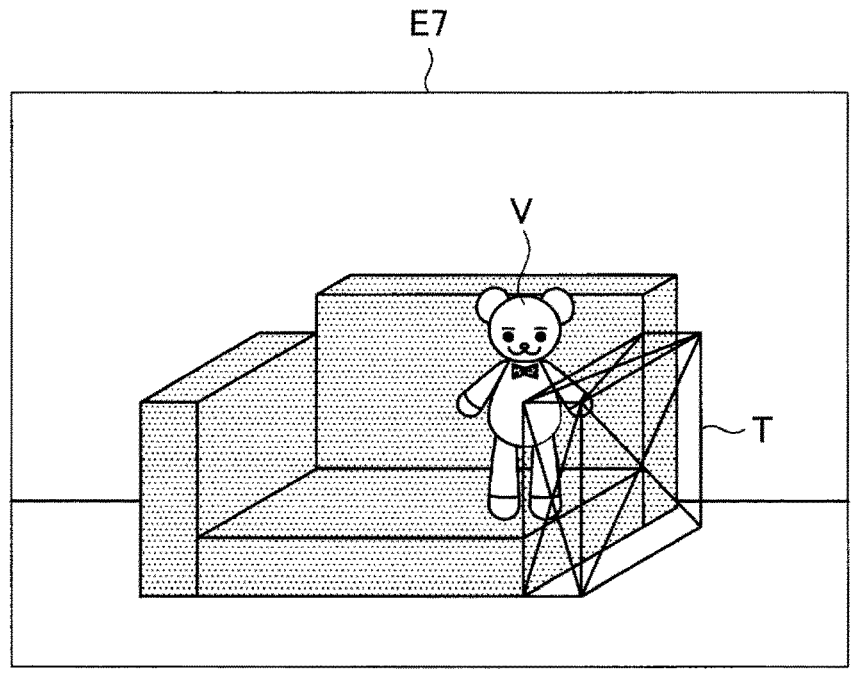
FIG. 11 is an explanatory diagram illustrating a third display control example.

FIG. 11 is an explanatory diagram illustrating the third display control example. The display control unit 136 may arrange, as the substitute object described above, a wire frame representing the shape of an armrest, which is a real object, for example, in the armrest region T specified as the low-reliability region. Therefore, as in an image E7 illustrated in FIG. 11, a display of the armrest region T is replaced with a display of the wire frame, with such a configuration, it is possible to reduce an unnatural impression given by the virtual object display V to the user, and to inform the user of a region where the accuracy of the three-dimensional data is insufficient.

(4-4. Fourth Display Control Example)

Also in a fourth display control example, at a position corresponding to the low-reliability region in the three-dimensional data, in particular, on a viewpoint position side of the low-reliability region in the three-dimensional data, an additional object which blocks a real object is arranged. Here, the viewpoint position is a position near the user. In the present embodiment, the distance measurement unit 120, the display unit 150, and the like are integrally configured in the information processing terminal 10, and the information processing terminal 10 is worn by the user, so that the viewpoint position can correspond to the position of the information processing terminal 10. On the other hand, in a case where the distance measurement unit 120 and the display unit 150 are separated and the distance measurement unit 120 is located away from the user, the viewpoint position can correspond to the position of the display unit 150 instead of the distance measurement unit 120. Hereinafter, such a fourth display control example will be described more specifically with reference to FIG. 12.

Figure 12:
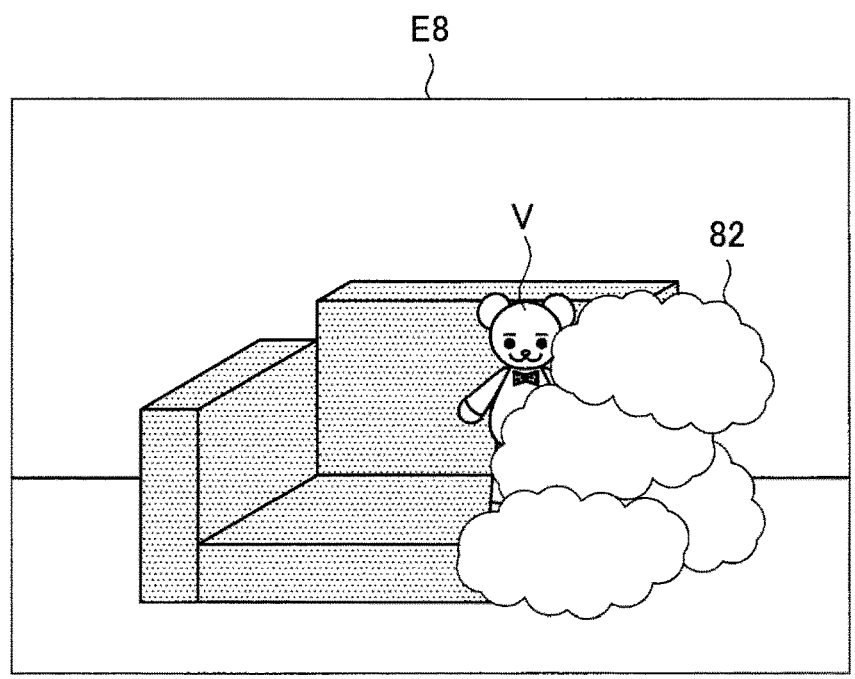
FIG. 12 is an explanatory diagram illustrating a fourth display control example.

FIG. 12 is an explanatory diagram illustrating the fourth display control example. The display control unit 136 may arrange, as the additional object described above, a cloud-shaped additional object which hides the armrest region, for example, on a viewpoint position side of the armrest region specified as the low-reliability region. Therefore, as in an image E8 illustrated in FIG. 12, an additional object 82 in a cloud shaped which appears to be present on a front side of the armrest region is displayed. With such a configuration, it is possible to reduce an unnatural impression given by the virtual object display V to the user in relation to the low-reliability region.

Here, a method of arranging an additional object will be specifically described with reference to FIGS. 13 and 14.

Figure 13:
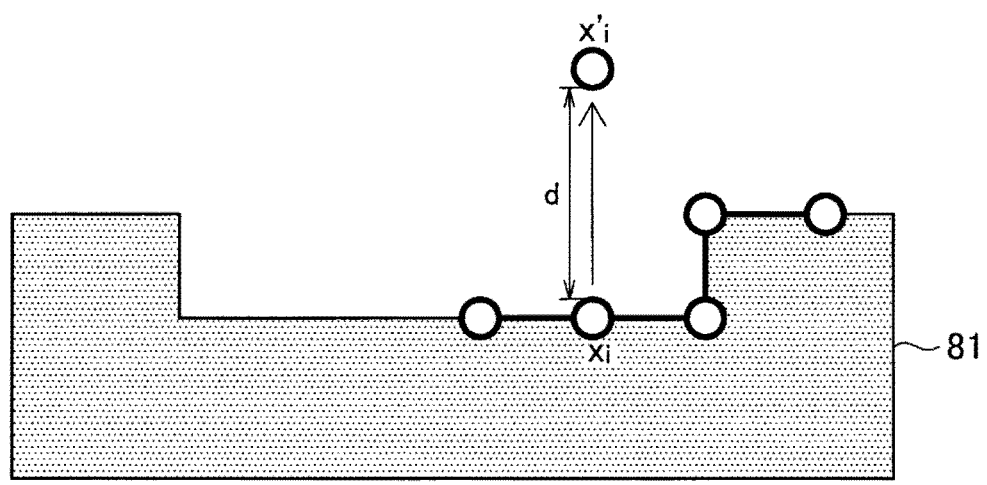
FIG. 13 is an explanatory diagram illustrating a method of arranging an additional object.

Consideration is given to a case where a range indicated by a bold line in three-dimensional data of a real object 81 in FIG. 13 is specified as the low-reliability region. In such a case, the display control unit 136 specifies a point (x'i) offset by a distance d in a normal direction from each vertex (xi) of each polygon mesh included in the low-reliability region, as illustrated in FIG. 13. The distance d may be a fixed value or a distance depending on a distance between a viewpoint position and the real object 81 (for example, a predetermined ratio of distance).

Then, when the points (x'i) corresponding to respective vertices (xi) are specified as illustrated in the left diagram of FIG. 14, the display control unit 136 sequentially arranges the additional objects 82 at the centers of the respective points (x'i) as illustrated in the left diagram of FIG. 14. Then, when all the points (x'i) are included in the additional objects 82, the display control unit 136 ends the arrangement of the additional objects 82.

Note that the display control unit 136 may perform the above-described arrangement of the additional object in a case where the position set for the virtual object and the low-reliability region overlap. This is because an error in an in-front/behind representation of the virtual object display and the low-reliability region may occur in the case where the position set for the virtual object and the low-reliability region overlap. Also in the second display control example and the third display control example, similarly, the above-described display control may be performed in the case where the position set for the virtual object and the low-reliability region overlap.

5. Hardware Configuration

The embodiment of the present disclosure has been described above. Information processing of the region specification, the display control, and the like described above is realized by cooperation between software and hardware of the information processing terminal 10 described below.

Figure 15:
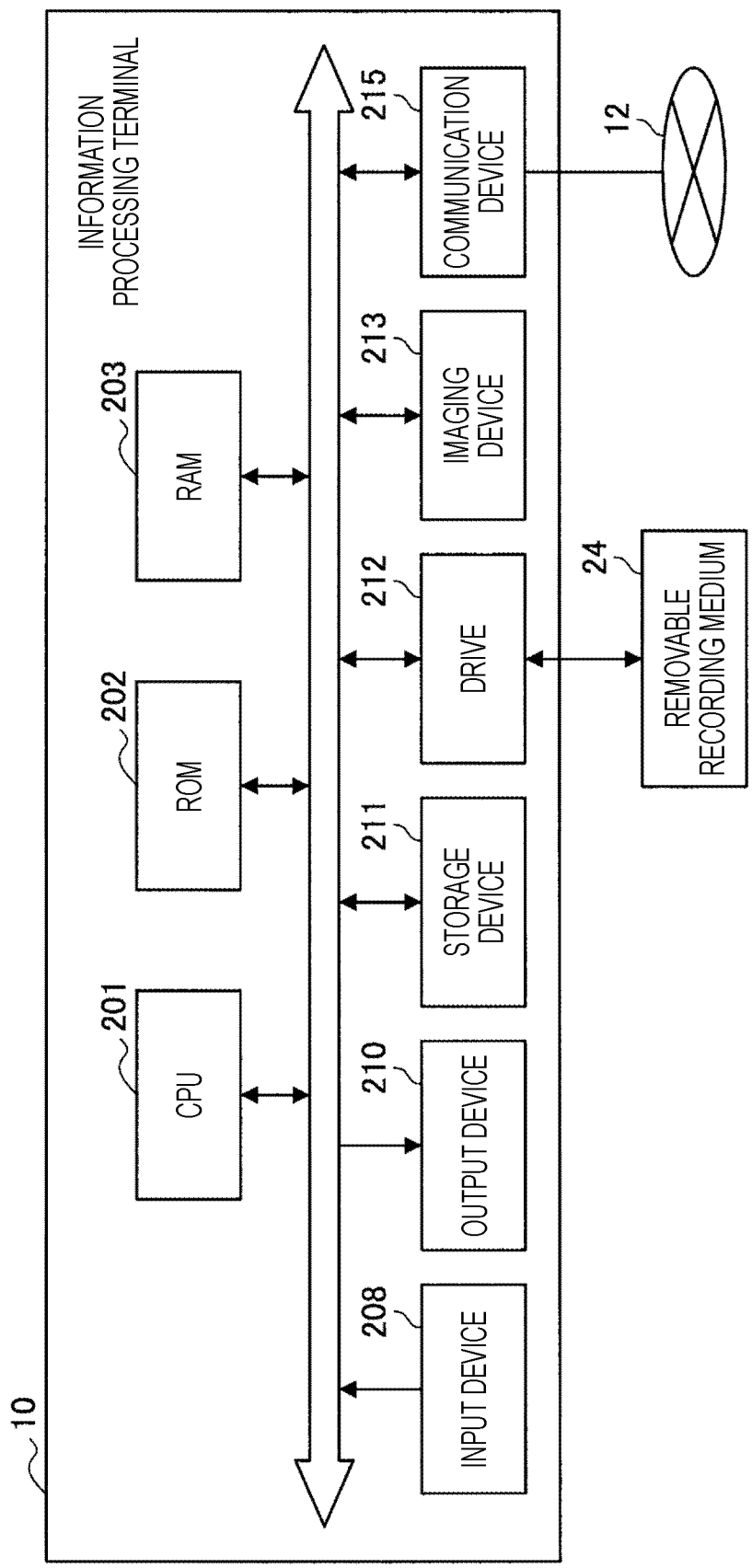
FIG. 15 is an explanatory diagram illustrating a hardware configuration of the information processing terminal 10.

FIG. 15 is an explanatory diagram illustrating a hardware configuration of the information processing terminal 10. As illustrated in FIG. 15, the information processing terminal 10 includes a central processing unit (CPU) 201, a read only memory (ROM) 202, a random access memory (RAM) 203, an input device 208, an output device 210, a storage device 211, a drive 212, an imaging device 213, and a communication device 215.

The CPU 201 functions as an arithmetic processing device and a control device, and controls overall operations in the information processing terminal 10 in accordance with various programs. Furthermore, the CPU 201 may be a microprocessor. The ROM 202 stores programs used by the CPU 201, calculation parameters, and the like. The RAM 203 temporarily stores programs used in the execution of the CPU 201, parameters that appropriately change in the execution, and the like. These are connected to each other by a host bus constituted by a CPU bus and the like. The functions of the three-dimensional integration unit 124, the reliability calculation unit 126, the region specification unit 134, the display control unit 136, and the like described above can be realized by cooperation between software and the CPU 201, the ROM 202, and the RAM 203.

The input device 208 includes an input unit for inputting information by the user, such as a mouse, a keyboard, a touch panel, a button, a microphone, a switch, and a lever, and an input control circuit which generates an input signal on the basis of an input by the user and outputs the input signal to the CPU 201. By operating the input device 208, the user of the information processing terminal 10 can input various data and indicate a processing operation to the information processing terminal 10.

The output device 210 includes, for example, a display device such as a liquid crystal display (LCD) device, an organic light emitting diode (OLED) device, and a lamp. Moreover, the output device 210 includes a sound output device such as a speaker and headphones. For example, the display device displays a captured image, a generated image, and the like. On the other hand, the sound output device converts sound data and the like into sound and outputs the sound.

The storage device 211 is a device for storing data configured as an example of a storage unit of the information processing terminal 10 according to the present embodiment. The storage device 211 may include a storage medium, a recording device which records data in the storage medium, a reading device which reads data from the storage medium, a deleting device which deletes data recorded in the storage medium, and the like. The storage device 211 stores programs executed by the CPU 201 and various data. The storage device 211 can include the function of the three-dimensional data with reliability storage unit 128 described with reference to FIG. 3.

The drive 212 is a reader/writer for a storage medium, and is built in or externally attached to the information processing terminal 10. The drive 212 reads information recorded in a removable storage medium 24 such as a magnetic disk, an optical disk, a magneto-optical disk, or semiconductor memory, inserted therein, and outputs the information to the RAM 203. Furthermore, the drive 212 can also write information to the removable storage medium 24.

The imaging device 213 includes an imaging optical system such as an imaging lens which condenses light and a zoom lens, and a signal conversion element such as a charge coupled device (CCD) or a complementary metal oxide semiconductor (CMOS). The imaging optical system condenses light emitted from a subject to form a subject image on a signal conversion unit, and the signal conversion element converts the formed subject image into an electrical image signal.

The communication device 215 is a communication interface including, for example, a communication device or the like for connecting to a network 12. Furthermore, the communication device 215 may be a wireless local area network (LAN)-compatible communication device, a long terra evolution (LTE)-compatible communication device, or a wired communication device which performs wired communication.

Note that the network 12 is a wired or wireless transmission path for information transmitted from a device connected to the network 12. For example, the network 12 may include a public network such as the Internet, a telephone network, and a satellite communication network, various local area networks (LANs) including Ethernet (registered trademark), wide area networks (WANs), and the like. Furthermore, the network 12 may include a dedicated network such as an Internet protocol-virtual private network (IP-VPN).

6. Conclusion

According to the embodiment of the present disclosure described above, various working effects can be obtained. For example, according to the embodiment of the present disclosure, even if there is an error in an in-front/behind representation of the virtual object display and the low-reliability region, the error becomes inconspicuous by changing the appearance of the low-reliability region, so that it is possible to reduce an unnatural impression given to the user.

Note that although the preferred embodiment of the present disclosure has been described in detail with reference to the accompanying drawings, the technical scope of the present disclosure is not limited to the above examples. A person having ordinary knowledge in a technical field of the present disclosure may obviously find various alterations and modifications within the scope of the technical ideas described in the appended claims, and it should be understood that they will naturally come under the technical scope of the present disclosure.

For example, although the example has been described above in which each of the configurations illustrated in FIG. 3 is included in the information processing terminal 10, some of the configurations illustrated in FIG. 3 may be mounted in another device. For example, at least one of the three-dimensional integration unit 124, the reliability calculation unit 126, the region specification unit 134, or the display control unit 136 may be mounted on a cloud server, and the cloud server may function as a display control apparatus.

Furthermore, the example has been described above in which a region corresponding to element data of which the reliability does not meet a criterion in the three-dimensional data with reliability calculated by the reliability calculation unit 126 is specified. However, the three-dimensional data with reliability used for specifying the region described above need not be the three-dimensional data with reliability calculated by the reliability calculation unit 126. For example, the three-dimensional data with reliability may be obtained by another method, for example, a method in which the three-dimensional data with reliability is received from a server on a network. Furthermore, the information processing terminal 10 may obtain the three-dimensional data with reliability by receiving three-dimensional data with an initial value of reliability from a server and processing or editing the three-dimensional data.

Furthermore, the respective steps in the process of the information processing terminal 10 in the present description do not necessarily be processed in time series in the order described as the flowchart. For example, the respective steps in the process of the information processing terminal 10 may be processed in an order different from the order described as the flowchart, or may be processed in parallel.

Furthermore, it is possible to create a computer program for causing the hardware such as the CPU, the ROM, and the RAM built in the information processing terminal 10 to exhibit the functions equivalent to the functions of the respective configurations of the information processing terminal 10 described above. Furthermore, a storage medium which has stored the computer program therein is also provided.

Furthermore, the effects described in the present description are explanatory or illustrative ones, and are not limitative ones. That is, the technique according to the present disclosure can achieve other effects that are apparent to those skilled in the art from the statement in the present description together with or in place of the effects described above.

Furthermore, the following configurations also belong to the technical scope of the present disclosure.

(1)

A display control apparatus including:

an information acquisition unit that acquires reliability information indicating reliability of each of element data constituting three-dimensional data of a real space;

a region specification unit that specifies a region corresponding to element data of which the reliability does not meet a criterion; and a display control unit that performs display control for changing the appearance of the region specified by the region specification unit.

(2)

The display control apparatus according to the above-described (1), in which the display control unit performs display control for reducing visibility of the region in an image.

(3)

The display control apparatus according to the above-described (2), in which the display control unit sets transparency to the region in the image.

(4)

The display control apparatus according to the above-described (2), in which the display control unit arranges another display in the region in the image.

(5)

The display control apparatus according to the above-described (1), in which the region specified by the region specification unit includes a three-dimensional region, and the display control unit arranges an object at a position corresponding to the three-dimensional region.

(6)

The display control apparatus according to the above-described (5), in which the position corresponding to the three-dimensional region is located at a same position as the three-dimensional region, or is located on a viewpoint position side of the three-dimensional region.

(7)

The display control apparatus according to any one of the above-described (1) to (6), in which the three-dimensional data is obtained by integrating a plurality of depth maps obtained at a plurality of viewpoint positions.

(8)

The display control apparatus according to the above-described (7), in which the reliability is associated with each of voxels or each of polygon meshes that is each of the element data that constitutes the three-dimensional data.

(9)

The display control apparatus according to the above-described (8), in which the display control apparatus further includes a reliability calculation unit that calculates the reliability of each voxel or a polygon mesh corresponding to each voxel on the basis of the sum of the numbers of times each voxel is observed in the plurality of depth maps.

(10)

The display control apparatus according to the above-described (8), in which in respective depth maps, individual reliability is set for a voxel observed in the respective depth maps, and the display control apparatus further includes a reliability calculation unit that calculates the reliability of each voxel or a polygon mesh corresponding to each voxel on the basis of the sum of individual reliabilities set for each voxel in the plurality of depth maps.

(11)

A program configured to cause a computer to function as:

an information acquisition unit that acquires reliability information indicating reliability of each of element data constituting three-dimensional data of a real space;

a region specification unit that specifies a region corresponding to element data of which the reliability does not meet a criterion; and a display control unit that performs display control for changing the appearance of the region specified by the region specification unit.

(12)

A display control method including:

acquiring reliability information indicating reliability of each of element data constituting three-dimensional data of a real space;

specifying a region corresponding to element data of which the reliability does not meet a criterion; and performing, by a processor, display control for changing an appearance of the region that has been specified.

REFERENCE SIGNS LIST

10 Information processing terminal
120 Distance measurement unit
122 Position estimation unit
124 Dimensional integration unit
126 Reliability calculation unit
128 Three-dimensional data storage unit
130 Imaging unit
132 Virtual object storage unit
134 Region specification unit
136 Display control unit
150 Display unit

The invention claimed is:

1. A display control apparatus comprising:

an information acquisition unit configured to acquire reliability information indicating reliability of each of element data constituting three-dimensional data of a real space;

a region specification unit configured to specify a region corresponding to element data of which the reliability does not meet a criterion; and a display control unit configured to
perform display control for changing an appearance of the region specified by the region specification unit, and
replace display of the region with display of a substitute object,
wherein the information acquisition unit, the region specification unit, and the display control unit are each implemented via at least one processor.

2. The display control apparatus according to claim 1, wherein the display control unit is further configured to perform display control for reducing visibility of the region in an image.

3. The display control apparatus according to claim 2, wherein the display control unit is further configured to set transparency to the region in the image.

4. The display control apparatus according to claim 2, wherein the display control unit is further configured to arrange another display in the region in the image.

5. The display control apparatus according to claim 1,
wherein the region specified by the region specification unit includes a three-dimensional region, and
the display control unit is further configured to arrange an object at a position corresponding to the three-dimensional region.

6. The display control apparatus according to claim 5, wherein the position corresponding to the three-dimensional region is located at a same position as the three-dimensional region, or is located on a viewpoint position side of the three-dimensional region.

7. The display control apparatus according to claim 1, wherein the three-dimensional data is obtained by integrating a plurality of depth maps obtained at a plurality of viewpoint positions.

8. The display control apparatus according to claim 7, wherein the reliability is associated with each of voxels or each of polygon meshes that is each of the element data that constitutes the three-dimensional data.

9. The display control apparatus according to claim 8, wherein the display control apparatus further comprises a reliability calculation unit configured to calculate the reliability of each voxel or a polygon mesh corresponding to each voxel on a basis of a sum of numbers of times each voxel is observed in the plurality of depth maps,
wherein the reliability calculation unit is implemented via at least one processor.

10. The display control apparatus according to claim 8,
wherein in respective depth maps, individual reliability is set for a voxel observed in the respective depth maps, and
the display control apparatus further comprises a reliability calculation unit configured to calculate the reliability of each voxel or a polygon mesh corresponding to each voxel on a basis of a sum of individual reliabilities set for each voxel in the plurality of depth maps,
wherein the reliability calculation unit is implemented via at least one processor.

11. A non-transitory computer-readable medium having embodied thereon a program, which when executed by a computer causes the computer to execute a display control method, the method comprising:
acquiring reliability information indicating reliability of each of element data constituting three-dimensional data of a real space;
specifying a region corresponding to element data of which the reliability does not meet a criterion;
performing display control for changing an appearance of the region; and
replacing display of the region with display of a substitute object.

12. A display control method comprising:
acquiring reliability information indicating reliability of each of element data constituting three-dimensional data of a real space;
specifying a region corresponding to element data of which the reliability does not meet a criterion;
performing, by a processor, display control for changing an appearance of the region that has been specified; and
replacing display of the region with display of a substitute object.

* * * * *